United States Patent Office 3,446,823
Patented May 27, 1969

3,446,823
17α-ETHYNYL-$\Delta^{1,3,5(10)}$-ESTRATRIENE AND PROCESS FOR THE PREPARATION THEREOF
Roberto Sciaky and Franco Mancini, Milan, Italy, assignors to Società Farmaceutici Italia, Milan, Italy, a corporation of Italy
No Drawing. Filed Nov. 17, 1966, Ser. No. 595,019
Claims priority, application Italy, Nov. 29, 1965, 26,437/65; July 8, 1966, 15,887/66
Int. Cl. C07c *169/08*
U.S. Cl. 260—397.5        3 Claims

ABSTRACT OF THE DISCLOSURE

Described is 3-(2'-chloro-ethoxy)-17α-ethynyl-17β-hydroxy-$\Delta^{1,3,5(10)}$-estratriene which is prepared by treating 17α-ethynyl-$\Delta^{1,3,5(10)}$-estratriene-3,17β-diol with ethylencarbonate, sulphonating the resulting 3-(2'-hydroxy-ethoxy)-17α-ethynyl-17β - hydroxy-$\Delta^{1,3,5(10)}$-estratriene with the chloride of a sulphonic acid, and reacting the resulting 3-2' - ethyoxyl-17α-ethynyl-17β-hydroxy-$\Delta^{,1,3,5(10)}$-estratriene sulphonate with lithium chloride. 3-(2'-chloro-ethoxy)-17α-ethynyl-17β-hydroxy-$\Delta^{1,3,5(10)}$estratriene is useful as an antiovulatory.

---

Our invention has as its object a new halogenated 3-ether of the estrane series and a process for its preparation. This new compound is 3-(2'-chloroethoxy)-17α-ethynyl-17β-hydroxy-$\Delta^{1,3,5(10)}$-estratriene and has the formula:

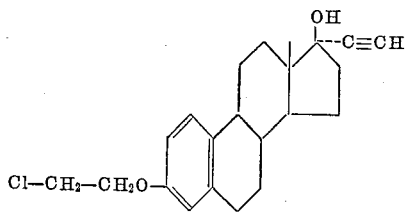

According to the invented process, 3-(2'-chloroethoxy)-17α-ethynyl-17β-hydroxy-$\Delta^{1,3,5(10)}$-estratriene is prepared from 17α-ethynyl-$\Delta^{1,3,5(10)}$-estratrien-3,17β-diol. The latter is first treated with a compound able to introduce the hydroxy-ethoxy group in 3-position and then made to react with the chloride of a sulphonic acid and subsequently with lithium chloride to obtain the corresponding 3-(2'-chloro-ethoxy)-17α-ethynyl-17β - hydroxy - $\Delta^{1,3,5(10)}$-estratriene.

In greater detail, 17α-ethynyl-$\Delta^{1,3,5(10)}$-estratriene-3,17β-diol is treated with ethylencarbonate in a solution of an alkali metal such as sodium, potassium or lithium in a tertiary alcohol. Excess reagent is removed by addition of alkali. The compound obtained is separated and crystallized from a suitable solvent such as methanol, ethyl ether, acetone or from their mixtures with petroleum ether, cyclohexane, chloroform, methylene chloride or by chromatography. The 3-(2'-hydroxy-ethoxy)-17α-ethynyl-17β-hydroxy - $\Delta^{1,3,5(10)}$ - estratriene obtained, dissolved in a base such as pyridine or chloroform containing small amounts of pyridine, is treated with the chloride of a sulphonic acid such as methansulphonic, benzensulphonic and paratoluenesulphonic acid at a temperature of from $-10°$ to $+30°$ C. This product is extracted with a suitable solvent which is evaporated off at reduced pressure. The sulphonate obtained is refluxed with lithium chloride in a polar solvent such as a lower aliphatic alcohol and extracted with a suitable organic solvent. The residue of the organic layer is purified by crystallization from solvents such as methanol, ether, acetone or from their mixtures with petroleum-ether, cyclohexane, chloroform, methylene chloride or by chromatography.

The compound of the invention is white crystalline, soluble in chlorinated solvents such as chloroform, methylene chloride and ethyl acetate. The new compound of our invention has a high estrogen activity thus making it usefully employed in the human field as antiovulatory, particularly suitable for oral administration, and in the veterinary field, particularly for sexual stimulation in the females of domestic animals and as coadjuvant in the treatment of certain infections of the genital female apparatus. 3-(2'-chloro-ethoxy)-17α-ethynyl-$\Delta^{1,3,5(10)}$-estratriene-17β-hydroxy shows a high estrogen activity either administered subcutaneously or orally. Although it is not esterified with long chain fat acids, it shows a prolonged effect, with duration proportional to the dose. Like all estrogenes, the compound of our invention is endowed with antigonadotrophic and antiovulatory activity. These activities have been tested using a standard 17α-ethynyl-$\Delta^{1,3,5(10)}$-estratrien-3,17β-diol in comparison to which 3-(2'-chloro-ethoxy)-17α-ethynyl - 17β - hydroxy-$\Delta^{1,3,5(10)}$-estratriene shows a similar activity when administered orally and a high long-acting action when administered parenterally. When administered orally, the compound does not appear to lose its effectiveness as sometimes happens with other compounds, but gains in effect.

The estrogene activity has been tested in the castrated adult rat by a single treatment. The effect is proved by the cornification of the cells of the vaginal epithelium and, in Table 1, it has been, if positive, indicated with +, if negative, indicated with —. In Table 1 the obtained results are listed.

TABLE 1

| Compound | Administration | EMD ($\mu$g.) | Estrogen activity | Duration day |
|---|---|---|---|---|
| 3-(2'-chloro-ethoxy)-17α-ethynyl-17β-hydroxy-$\Delta^{1,3,5(10)}$-estratriene. | Subcutaneous | 3 | + | 1 |
| | do | 10 | + | 5 |
| | do | 30 | + | 9 |
| | do | 100 | + | 17 |
| | Oral | 1 | — | / |
| | do | 3 | + | / |
| 17α-ethynyl-$\Delta^{1,3,5(10)}$-estratrien-3,17β-diol. | Subcutaneous | 0.3 | + | 1 |
| | do | 1 | + | 1 |
| | do | 3 | + | 1 |
| | do | 10 | + | 2 |
| | do | 30 | + | 3 |
| | do | 100 | + | 7 |
| | Oral | 1 | — | / |
| | do | 3 | + | / |

The effective minimum dose (EMD) is the amount of the active substance able to give 2 out of 3 of the treated animals a proestric stimulation of the vaginal epithelium or to provoke the estrus in 1 out of 3 treated animals. As is seen from the data in Table 1, 3-(2'-chloro-ethoxy)17α-ethynyl-17β-hydroxy-$\Delta^{1,3,5(10)}$-estratiene is in absolute terms, less effective than 17α-ethynyl-$\Delta^{1,3,5(10)}$- estratriene-3,17α-diol by the subcutaneous route as its activity appears at the dose of 3μg. instead of 0.3 μg. as for the standard compound. However, it has the same activity of 17α-ethynyl-$\Delta^{1,3,5(10)}$-estratriene - 3,17β - diol when administered by oral route. (Effective minimum dose =3 μg. for both.) More important is that 3-(2'-chloro-ethoxy-17α-ethynyl - 17β - hydroxy - $\Delta^{1,3,5(10)}$ - estratriene has a prolonged effect by subcutaneous route which is proportional to the injected dose. At the same dosages as the standard, it shows a clearly prolonged activity.

The antiovulatory activity has been tested in the adult female rat with a regular cycle and daily treated for a whole cycle at the end of which the ovary tubes had been examined in order to establish the presence of ova.

3-(2'-chloro - ethoxy) - 17α - ethynyl - 17β - hydroxy-$\Delta^{1,3,5(10)}$-estratriene has shown a good antiovulatory effect either subcutaneously or, especially, orally. In Table 2 are reported the data of $ED_{50}$ calculated for both the subcutaneous and oral administration of the compound of the invention and of the standard.

TABLE 2

| Compound | Administration | $ED_{50}$ (μg.) |
|---|---|---|
| 3-(2'-chloro-ethoxy)-17α-ethynyl-17β-hydroxy-$\Delta^{1,3,5(10)}$-estratriene. | Subcutaneous | 72.5 |
|  | Oral | 29.5 |
| 17α-ethynyl-$\Delta^{1,3,5(10)}$-estratrien-3,17β-diol. | Subcutaneous | 0.37 |
|  | Oral | 30 |

The effective dose$_{50}$ ($ED_{50}$) is the amount of active substance able to produce the desired effect on 50% of treated animals.

The antigonadotrophic activity has been studied by using the technique of the parabiosis in the impuberal rat (castrated male-untouched female). 3-(2'-chloro-ethoxy)-17α-ethynyl-17β - hydroxy - $\Delta^{1,3,5(10)}$ - estratriene by subcutaneous administration has shown $ED_{50}$=0.64 μg./day while by oral administration $ED_{50}$=0.9 μg./day.

In the veterinary field 3-(2' - chloro - ethoxy) - 17α-ethynyl-17β-hydroxy-$\Delta^{1,3,5(10)}$-estratriene is indicated in all those cases in which in the females of the domestic animals a sexual stimulation is required due to an incomplete alimentation, functional conditions or particular individual causes. It is also successfully employed in the treatment of all the various forms of metritis, endometritis, pyometritis in which a lively reactivation of the genital apparatus circulation or the expulsion of the pathological material from the uterus is required. To this purpose, the compound of the invention can be also employed in females having normal heat, but affected by purulent metritis.

The following example serves to illustrate the preparation of the compound of the invention without limiting the invention.

Example.—3-(2'-chloro-ethoxy)-17α-ethynyl-17β-hydroxy-$\Delta^{1,3,5(10)}$-estratriene 0.5 g. of ethynylestradiol and 1.6 g. of ethylencarbonate are added to a solution of 80 mg. of sodium in 10 cc. of tert. amyl alcohol. The mixture thus obtained is refluxed under stirring for 90 minutes. After cooling to room temperature, 50 cc. of a 5 N NaOH solution are added and the mixture is stirred for 15 minutes. It is then extracted three times with ethyl acetate and the organic layers, after washing to neutrality, are dried over anhydrous sodium sulphate and evaporated under reduced pressure to dryness. The residue, taken up with acetone/petroleum ether, gives 0.4 g. of 3-(2'-hydroxy-ethoxy)-17α-ethynyl-17β-hydroxy-$\Delta^{1,3,5(10)}$-estratriene melting at 170–173° C.

1.6 g. of this product are dissolved in 25 cc. of anhydrous pyridine. The solution is cooled with ice. 1.2 cc. of mesyl chloride is added and allowed to stand overnight at 0° C. The mixture is poured into ice-cooled water, extracted with methylene chloride, washed to neutrality with water and dried over anhydrous sodium sulphate. The solvent is evaporated off under reduced pressure and the residue, which weighs 1.9 g., is dissolved in 120 cc. of isopropanol. 5 g. of lithium chloride are added and the mixture refluxed for 5 hours is then concentrated to a small volume, taken up with water and extracted with ethyl acetate. The organic layer is washed with water to neutrality and evaporated under vacuo to dryness. The residue dissolved in benzene is passed through 40 g. of Florisil 30:60 mesh (activated magnesium silicate) eluating with chloroform.

The eluates are collected, evaporated and crystallized from acetone/ether/petroleum ether. 0.8 g. of 3-(2'-chloro-ethoxy)-17α - ethynyl - 17β - hydroxy - $\Delta^{1,3,5(10)}$-estratriene are obtained, melting at 145–147° C.;

$$[\alpha]_D^{CHCl_3} = +23°$$

We claim:

1. 3-(2'-chloro-ethoxy)-17α - ethynyl - 17β - hydroxy-$\Delta^{1,3,5(10)}$-estratriene.

2. The process of preparing the compound of claim 1, which comprises treating 17α-ethynyl-$\Delta^{1,3,5(10)}$-estratriene-3,17β-diol with ethylencarbonate, sulphonating the resulting 3-(2'-hydroxy-ethoxy)-17α-ethynyl - 17β - hydroxy-$\Delta^{1,3,5(10)}$-estratriene with the chloride of a sulphonic acid, and reacting the resulting 3-2'-ethyoxyl-17α-ethynyl-17β-hydroxy-$\Delta^{1,3,5(10)}$-estratriene sulphonate with lithium chloride.

3. The process of claim 2, wherein the final product is separated from the reaction mixture.

References Cited

UNITED STATES PATENTS 3,336,345    8/1967    Evans _____ 260—397.4

ELBERT L. ROBERTS, *Primary Examiner.*